(12) United States Patent
Herkommer et al.

(10) Patent No.: US 10,408,285 B2
(45) Date of Patent: Sep. 10, 2019

(54) FLUID ARRANGEMENT

(71) Applicant: SCHAEFFLER TECHNOLOGIES AG & CO. KG, Herzogenaurach (DE)

(72) Inventors: Dominik Herkommer, Schriesheim (DE); Reinhard Stehr, Buehl (DE); Marco Grethel, Buehlertal (DE); Markus Baehr, Buehl (DE)

(73) Assignee: SCHAEFFLER TECHNOLOGIES AG & CO. KG., Herzogenaurach (DE)

( * ) Notice: Subject to any disclaimer, the term of this patent is extended or adjusted under 35 U.S.C. 154(b) by 131 days.

(21) Appl. No.: 15/545,589

(22) PCT Filed: Feb. 8, 2016

(86) PCT No.: PCT/DE2016/200080
§ 371 (c)(1),
(2) Date: Jul. 21, 2017

(87) PCT Pub. No.: WO2016/127994
PCT Pub. Date: Aug. 18, 2016

(65) Prior Publication Data
US 2018/0003248 A1 Jan. 4, 2018

(30) Foreign Application Priority Data
Feb. 12, 2015 (DE) .................. 10 2015 202 581

(51) Int. Cl.
*F16D 48/02* (2006.01)
*F15B 1/033* (2006.01)
(Continued)

(52) U.S. Cl.
CPC .......... *F16D 48/0206* (2013.01); *F15B 1/033* (2013.01); *F15B 11/165* (2013.01);
(Continued)

(58) Field of Classification Search
CPC ......... F16D 48/0206; F16D 2048/0203; F16D 2048/0221; F16D 2048/0266;
(Continued)

(56) References Cited

U.S. PATENT DOCUMENTS 4,475,641 A 10/1984 Ballendux et al.
8,042,672 B2 10/2011 Grethel et al.
(Continued)

FOREIGN PATENT DOCUMENTS

CN 101400917 A 4/2009
DE 102008009653 A1 9/2008
(Continued)

OTHER PUBLICATIONS

International Search Report for Application No. PCT/DE2016/200080, dated Jun. 1, 2016, 5 Pages.
Chinese Office Action for Application No. 201680008444.7, dated Jun. 17, 2019, 8 Pages.

*Primary Examiner* — Jacob S. Scott
*Assistant Examiner* — Lori Wu
(74) *Attorney, Agent, or Firm* — Brooks Kushman P.C.

(57) ABSTRACT

A fluid assembly in a hydraulic circuit, comprising one or more reservoirs configured to store fluid. The fluid assembly also includes a pump configured to transport the fluid in the hydraulic circuit and actuate a load from a transmission of a motor vehicle, a pressure accumulator configured to collect pressure built up by the pump and actuate the load, and a valve system configured to allow fluid communication of the load with the pump.

15 Claims, 5 Drawing Sheets

(51) Int. Cl.
*F15B 11/16* (2006.01)
*F16H 61/30* (2006.01)
*F16H 61/688* (2006.01)

(52) U.S. Cl.
CPC ........... *F16H 61/30* (2013.01); *F16H 61/688* (2013.01); *F16D 2048/0221* (2013.01); *F16D 2048/0266* (2013.01); *F16D 2048/0269* (2013.01); *F16D 2048/0275* (2013.01); *F16D 2048/0278* (2013.01)

(58) Field of Classification Search
CPC ..... F16D 2048/0269; F16D 2048/0275; F16D 2048/0278; F16D 2048/0281; F16D 2048/0293; F16H 61/688; F16H 61/30; F15B 1/033; F15B 11/165
See application file for complete search history.

(56) References Cited

U.S. PATENT DOCUMENTS

| | | | |
|---|---|---|---|
| 2009/0088297 A1* | 4/2009 | Grethel | F16D 48/04 477/158 |
| 2011/0284337 A1* | 11/2011 | Gassmann | B60K 17/35 192/48.601 |
| 2015/0027253 A1 | 1/2015 | Yi et al. | |

FOREIGN PATENT DOCUMENTS

| | | |
|---|---|---|
| EP | 0428847 A1 | 9/1990 |
| WO | 2015021981 A1 | 2/2015 |

* cited by examiner

FLUID ARRANGEMENT

CROSS-REFERENCE TO RELATED APPLICATIONS

This application is the U.S. National Phase Application of PCT Appln. No. PCT/DE2016/200080 filed Feb. 8, 2016, which claims priority to DE Patent Application No. 10 2015 202 581.0 filed Feb. 12, 2015, the disclosures of which are incorporated in their entirety by reference herein.

TECHNICAL FIELD

The disclosure relates to a fluid assembly and a method for fluidic actuation of at least one load of a motor vehicle.

BACKGROUND

A fluid assembly for controlling a double clutch transmission of a motor vehicle is disclosed in DE 10 2008 009 653 A1. The fluid assembly may include a hydraulic energy source for supplying the fluid assembly with hydraulic energy by means of a hydraulic medium, a pressure accumulator for storing the hydraulic energy, a clutch cooling system for cooling clutches of the double clutch transmission by means of the hydraulic medium, and clutch actuators for actuating a first clutch and a second clutch, wherein the hydraulic energy source may include a dual-flow electrical pump.

SUMMARY

There may be the constant need to simplify the actuation of at least one load in a fluid assembly with a fluidic energy source.

The object of one embodiment is to create a fluid assembly with measures that may simplify the actuation of at least one load with a fluidic energy source.

The solution for this objective may be achieved according to an embodiment of a fluid assembly and alternative embodiments are given in the disclosure below, each of which may represent, individually or in combinations thereof, an aspect of the disclosure.

The disclosure relates to a fluid assembly for the fluidic actuation of a first load and/or a second load of a motor vehicle in a hydraulic circuit, comprising a pump for conveying a fluid in the hydraulic circuit, a pressure accumulator for accumulating pressure built up by the pump, at least one reservoir for storing fluid, and a valve system for connecting the hydraulic circuit, wherein the valve system, the first load, and/or the second load, the pump, the pressure accumulator and the reservoir are interconnected, and wherein the first load and/or the second load can be actuated by the pump and/or the pressure accumulator.

As a result of the valve system, a second actuator, e.g. a second pump for actuating the load, can be eliminated. The first load and/or the second load can be actuated instead with just one pump and/or the pressure accumulator. The valve system can enable a connection that connects the pump with the first load and/or the second load; in particular when the load is a double clutch, the valve system can connect the pump with one of the sub-clutches. Furthermore, the valve system can connect the pressure accumulator with the first load and/or the second load; in particular when the load is a double clutch, the valve system can connect the pressure accumulator with one of the sub-clutches. Another connection possibility can be the connection between the pump and the pressure accumulator. By way of example, the pump can fill the pressure accumulator while the first load is not actuated, e.g. when the clutch is disengaged. Another example is the filling of the pressure accumulator via the pump when the first load is actuated, e.g. an engaged clutch with excess contact pressure, such that the torque that can be transferred by the clutch is greater than the torque generated by the motor by a predefined quantity. By way of example, the clutch can be actuated by the pressure accumulator, and the pump can simultaneously fill the pressure accumulator with fluid. The valve system can also block the load, such that fluid for actuating the load cannot flow to the load. The fluid can also be discharged from the load connected to the pressure accumulator into the reservoir through the valve system, wherein preferably the pressure accumulator is previously disconnected by the valve system, such that the pressure accumulator can maintain the pressure. By way of example, the valve system can also connect both sub-clutches to the reservoir when the load is a double clutch. In this manner, a reliably open state, e.g. a functional reliability (abbreviated in German to "FuSi" for the German term "Funktionssicherheit"), can be obtained. When parking the vehicle, a connection of all of the fluid spaces to the reservoir can be enabled using the valve system. Furthermore, instead of providing an individual actuator for each load, e.g. an individual pump, the first load or the second load can be actuated via the pressure accumulator, e.g. for a quick actuation in order to overcome a free travel. In this manner, components for a fluid assembly can be eliminated, by means of which the fluid assembly can be simplified. Furthermore, the energy balance in the fluid assembly can be improved through the use of a pump and a pressure accumulator, because a usable portion of the pressure accumulator can be used directly to actuate a load. Many diverse connection possibilities can be implemented with a fluid assemble designed in this manner, by means of which the actuation of at least one load with a fluidic energy source can be simplified in a fluid assembly.

The fluid assembly may be a hydraulic assembly that is operated with a hydraulic medium, such as hydraulic fluid. The pump may be a hydraulic pump, in particular having a positive displacement design, e.g. a vane pump, a gearwheel pump, or a piston pump. An electric motor may be used, for example, to drive the pump. The pump used to actuate the at least one load may be also referred to as a pump actuator. The load can be a transmission component, for example, such as a gear setting device, which can be used for guiding a selection and/or shifting movement. Furthermore, the at least one load can be a clutch, e.g. a single clutch or a double clutch. The clutch can be actuated directly or indirectly. The clutch can furthermore have a wet or dry running design.

In a preferred embodiment, the first load, in particular a clutch, and the second load, in particular a transmission actuator, are connected to the pump. In this manner, the pump can actuate either the first load or the second load.

The pump preferably comprises a first discharge direction for actuating the first load, and a second discharge direction opposite to the first discharge direction, for actuating the second load. As a result, the pressure direction of the pump can be set according to the load that is to be actuated.

In a preferred embodiment, the reservoir for storing fluid is connected in the direction of the first load and in the direction of the second load through the interconnection of a dual-pressure valve. It can be ensured in a simple manner by the dual-pressure valve that pressure can only be applied in one direction. After the pressure diminishes, it can be switched in the other direction. The dual-pressure valve has two settings. In a first setting, the dual-pressure valve can be connected in the direction of the first load, and in a second setting, the dual-pressure valve can be connected in the direction of the second load. When pressure is built up, for example, toward the first load, the dual-pressure valve is in the first setting. This first setting is maintained by the dual-pressure valve as long as there is pressure applied to the first load. In this manner, it is possible to prevent an actuation of the second load when the pressure direction of the pump is reversed.

The pressure accumulator may be connected to the first load and the second load. In particular, the pressure accumulator can be connected to the first load and the second load via the valve system. By way of example, the valve system can have a setting that connects the pressure accumulator to the first load or the second load. In particular, the pressure accumulator can actuate the first load or the second load through such a connection.

In a preferred embodiment, the valve system may include a setting in which the pressure accumulator and the pump are interconnected in order to actuate the first load or the second load. By way of example, the pressure accumulator can support the pump when actuating the first load or the second load, such that the pressure accumulator provides pressure for actuating the load, and the pump simultaneously actuates the load. By way of example, a first load, e.g. a clutch, can be kept in an engaged setting by the pressure of the pressure accumulator, wherein the pump does not need as much energy to maintain the actuation pressure as a result of the pressure accumulator. In particular, a clutch can be kept engaged up to a maximum pressure of an excess contact pressure using the pressure accumulator. In this manner, energy can be conserved, and the energy balance of the fluid assembly can be improved.

The first load may be a double clutch, wherein the double clutch comprises a first sub-clutch and a second sub-clutch, wherein the valve system comprises a setting in which the first sub-clutch and/or the second sub-clutch can be actuated by the pump. By way of example, the first sub-clutch and the second sub-clutch could be engaged simultaneously by the pump. In particular, an independent actuation of both sub-clutches by the pump can occur. The pressure accumulator can be completely separated from the fluid assembly by the valve system thereby, such that the pump can actuate just the first load. In this manner, a full functioning of the first sub-clutch and the second sub-clutch can be enabled using just one pump. In this manner, a second actuator, e.g. a second pump, for actuating a double clutch can be eliminated. By using a pump, the energy consumption for actuating the double clutch can be further reduced, such that the energy consumption can also be optimized.

In particular, the pressure accumulator and the pump can be connected to the first sub-clutch and/or the second sub-clutch collectively via a shared hydraulic line, such that the pump and the pressure accumulator can function simultaneously, in order to actuate the first sub-clutch and/or the second sub-clutch. In this manner, energy for actuating the clutch by the pump can be conserved using the pressure provided by the pressure accumulated.

The valve system may include a setting, in which the pump actuates the first sub-clutch or the second sub-clutch, and the pressure accumulator actuates the first sub-clutch or the second sub-clutch, wherein the sub-clutch actuated by the pump is not the sub-clutch actuated by the pressure accumulator. In this manner, the pressure accumulator can engage the first sub-clutch, for example, while the pump disengages the second sub-clutch. As a result, a further actuator, e.g. a second pump, is unnecessary. Furthermore, the pump and the pressure accumulator can be connected to the sub-clutches via different hydraulic lines.

The valve system may include a setting in which the pressure accumulator actuates the first load or the second load, and simultaneously, and independently of the pressure accumulator, the pump actuates the first load or the second load, wherein the load actuated by the pump is not the load actuated by the pressure accumulator. By way of example, the pump can actuate a second load, in particular a hydrostatic transmission actuator, and the pressure accumulator can simultaneously actuate the first load, e.g., with a double clutch, it can modulate a sub-clutch.

The disclosure may further relate to a method for the fluidic actuation of a first load and/or second load of a motor vehicle, having a fluidic energy source, in particular having a fluid assembly, which can be designed and developed as described above, wherein the fluid assembly comprises a valve system, and the first load and/or the second load can be interconnected to the pump, the pressure accumulator, and the reservoir by the valve system, wherein the first load and/or the second load can be actuated by the pump and/or the pressure accumulator.

Numerous diverse connection options can be implemented by a method having a fluid assembly that can be designed and developed as described above, by means of which the actuation of at least one load with a fluidic energy source can be simplified in a fluid assembly.

The first load or the second load may be actuated by the pressure accumulator, and simultaneously, and independently of the pressure accumulator, the first load or the second load is actuated by the pump, wherein the load actuated by the pump is not the load actuated by the pressure accumulator.

BRIEF DESCRIPTION OF THE DRAWINGS

The various embodiments shall be explained by way of example below, with reference to the attached drawings based on exemplary embodiments, wherein the features depicted below can represent an aspect of the embodiment in and of themselves as well as in combinations thereof. Therein.

DETAILED DESCRIPTION

Figure 1:
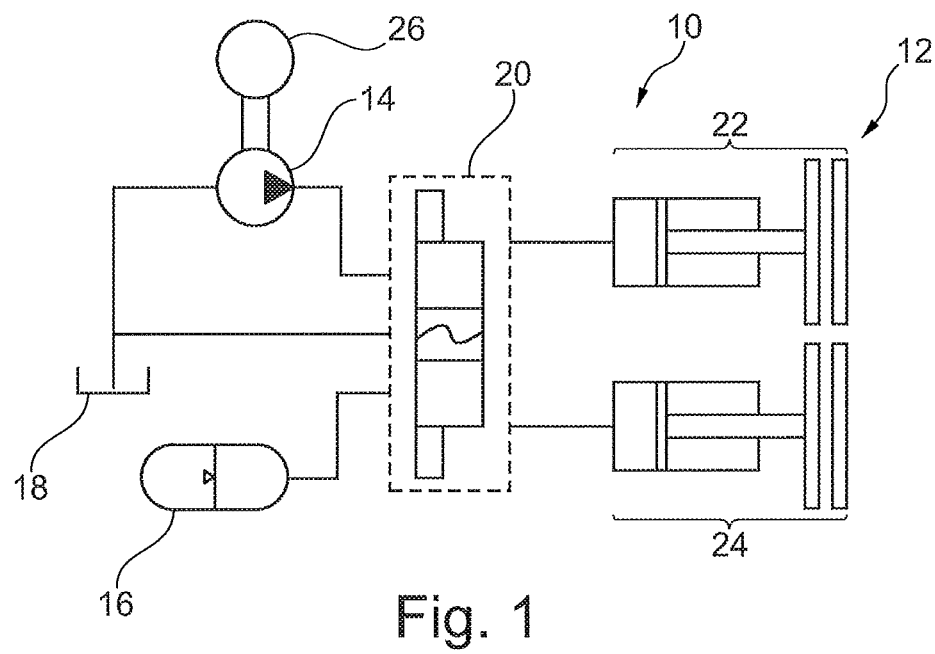
FIG. 1: shows a schematic illustration of a fluid assembly having one load.

A fluid assembly 10 for the fluidic actuation of a load 12 of a, not shown, motor vehicle in a hydraulic circuit is depicted in FIG. 1. The hydraulic circuit is depicted as a line between the individual components of the fluid assembly 10. The fluid assembly 10 comprises a pump 14 for conveying a fluid in the hydraulic circuit, a pressure accumulator 16 for accumulating a pressure generated by the pump 18, at least one reservoir 18, for storing fluid, and a valve system 20 for connecting the hydraulic circuit. The pump 14 is powered by an electrical motor 26.

The load 12 is depicted as a double clutch having a first sub-clutch 22 and a second sub-clutch 24. The valve system 20 may enable various connections to be established in the fluid assembly thereby. The valve system 20 can connect the pump 14 to the first sub-clutch 22 or the second sub-clutch 24. The valve system 20 may also connect the pressure accumulator 16 to the first sub-clutch 22 or the second sub-clutch 24. The valve system 20 may also connect the pump 14 to the pressure accumulator 16 in order to build up pressure in the pressure accumulator 16. The valve system may also block the first sub-clutch 22 and the second sub-clutch 24. The valve system may be configured to discharge the fluid from the sub-clutch connected to the pressure accumulator 16 into the reservoir 18, wherein the pressure accumulator 16 may be separated to ensure that the pressure in the pressure accumulator does not drop. The valve system may also be configured to produce a connection of the first sub-clutch 22 and the second sub-clutch 24 to the reservoir 18 in order to enable a reliably disengaged state, a so-called functional reliability (abbreviated in German as FuSi) or to create a connection of all of the fluid spaces in the fluid assembly to the reservoir 18 when the vehicle is parked.

Figure 2:
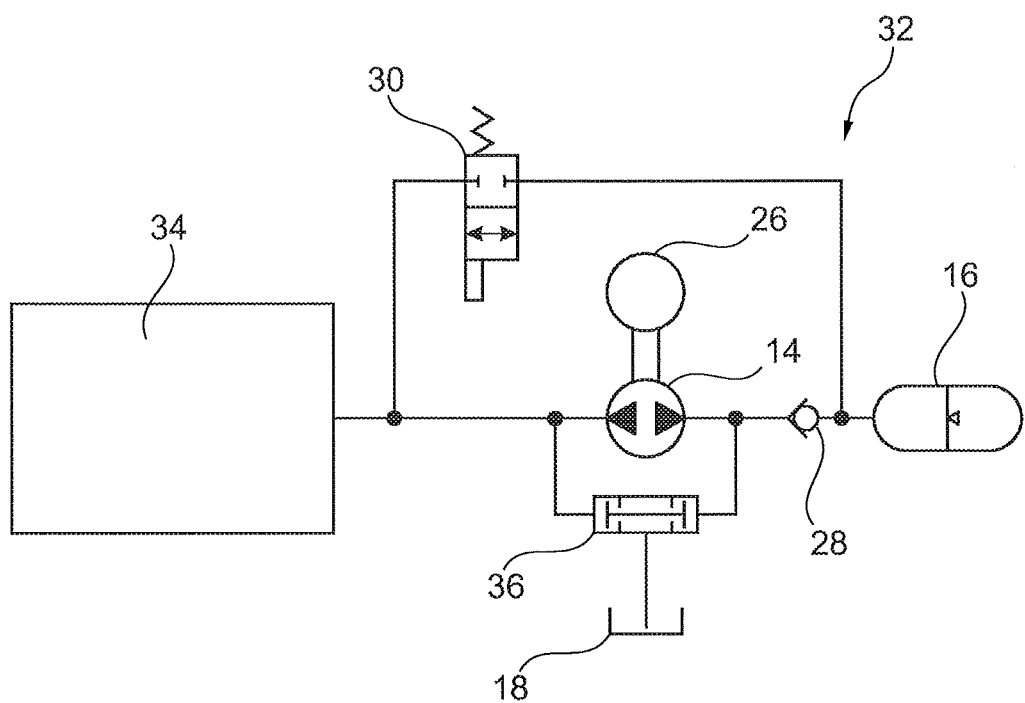
FIG. 2: shows a schematic illustration of another fluid assembly having one load.

Another embodiment of a fluid assembly 32 is depicted in FIG. 2. The same reference symbols are used for identical components in the fluid assembly 32 as in the fluid assembly 10 in FIG. 1. The valve system in this exemplary embodiment comprises a non-return valve 28 and a seated valve 30. The non-return valve 28 prevents the pressure accumulator 16 from conveying fluid to the pump 14. Only the pump 14 can transfer fluid to the pressure accumulator 16. The seated valve 30 is a 2/2 directional valve having a closed setting for connecting the pressure accumulator 16 to the load 34, and an open setting for preventing a connection of the pressure accumulator 16 to the load 34. The seated valve 30 is depicted in the open setting in FIG. 2. The load 34 can be a transmission actuator or a clutch. The fluid assembly 32 furthermore comprises a pump 14, which is actuated by an electrical motor 26. The pump 14 is connected to a reservoir 18 via a dual-pressure valve 36. The pump 14 comprises a first discharge direction for actuating the load 34 and a second discharge direction, opposite the first discharge direction, for building up pressure in the pressure accumulator 16. The first discharge direction and the second discharge direction are depicted as arrows in the pump 14. By interconnecting the dual-pressure valve 36, the pump 14 can be connected toward the load 34 and toward the pressure accumulator 16. The dual-pressure valve 36 has two settings. In a first setting, the dual-pressure valve 36 can be connected toward the load 34, and in a second setting, the dual-pressure valve 36 can be connected toward the pressure accumulator 16, in order to connect the respective direction to the reservoir 18. When, for example, pressure is built up by the pump 16 toward the load 34, the dual-pressure valve 36 is in the first setting. This first setting is maintained by the dual-pressure valve 36 if there is pressure directed toward the load 34. In this manner, it is possible to prevent the pressure accumulator 16 from being filled with fluid when the discharge direction of the pump 14 is reversed.

Figure 3:
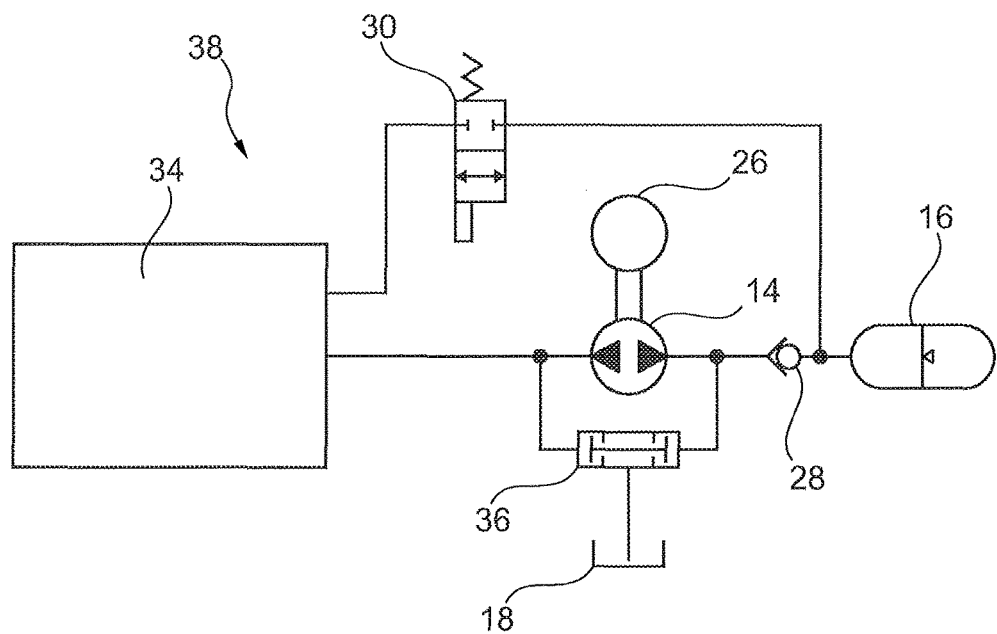
FIG. 3: shows a schematic illustration of another fluid assembly having one load.

Another embodiment of a fluid assembly 38 is depicted in FIG. 3. The same reference symbols are used for identical components in FIG. 3 as in FIG. 2. In FIG. 3, the pressure accumulator 16 is connected via a hydraulic line directly to the load 34, via the seated valve 30.

Figure 4:
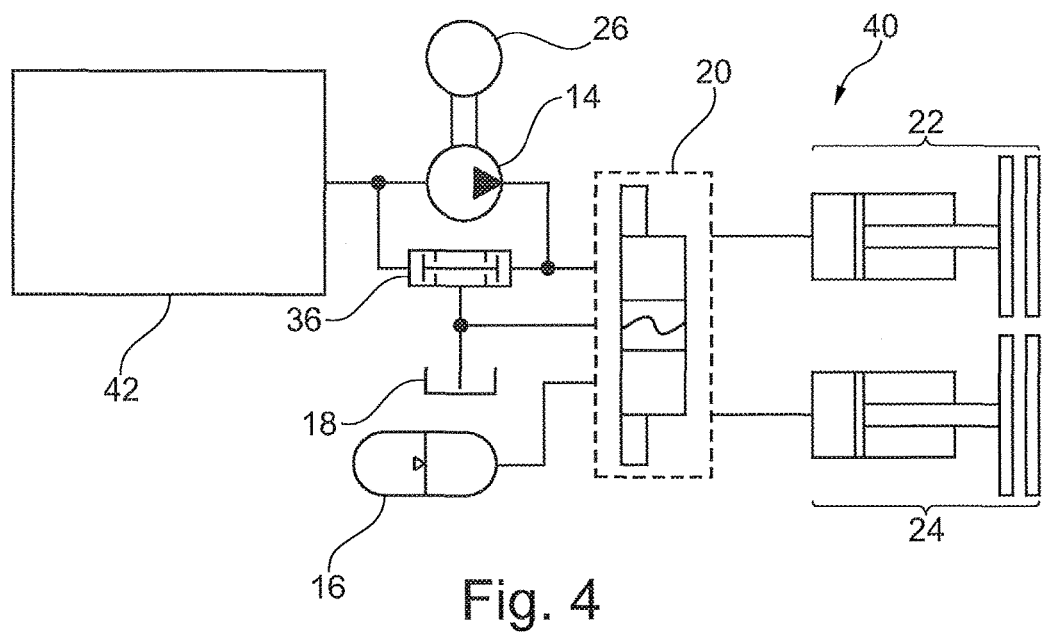
FIG. 4: shows a schematic illustration of a fluid assembly having two loads.

Another embodiment of a fluid assembly 40 is depicted in FIG. 4. The same reference symbols are used for identical components in FIG. 4 as in FIG. 1 and FIG. 2. In FIG. 4, the pump 14 is connected to a second load 42, e.g. a transmission actuator. Furthermore, the fluid assembly 40 has a dual-pressure valve 36. The pump 14 has a first discharge direction for actuating the double clutch, and a second discharge direction for actuating the second load 42.

Figure 5:
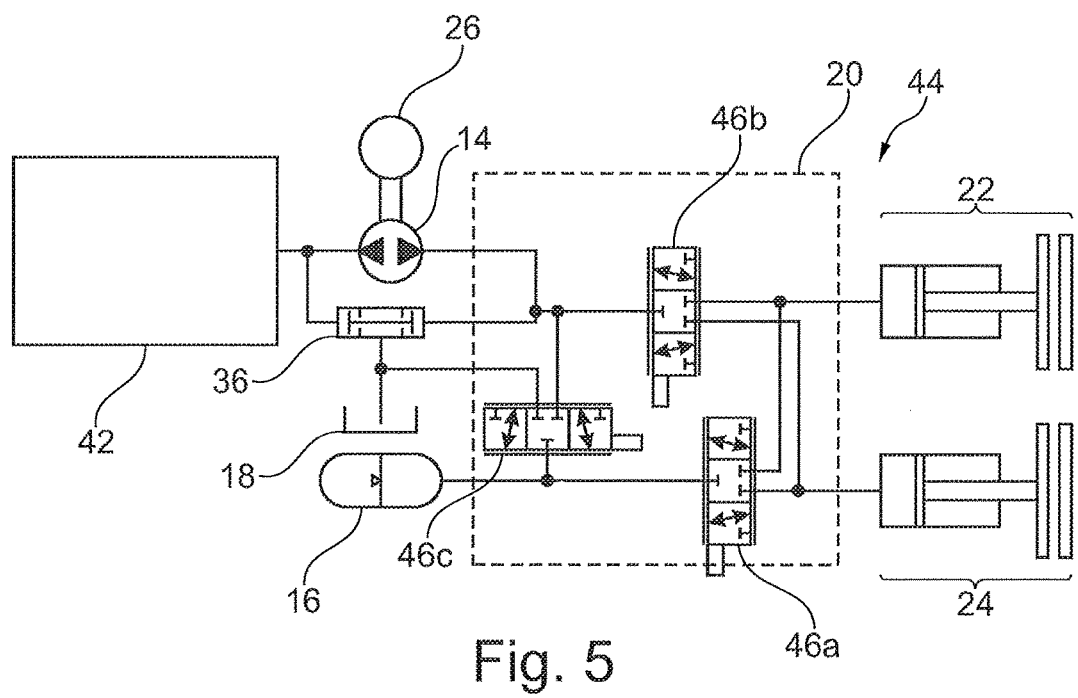
FIG. 5: shows a schematic illustration of a fluid assembly having 3/3 directional valves.

Another embodiment of a fluid assembly 44 is depicted in FIG. 5. The same reference symbols are used for identical components in FIG. 5 as in FIG. 4. In FIG. 4, the valve system 20 comprises three 3/3 directional valves 46a, b, c. The 3/3 directional valve 46a enables a connection of the pressure accumulator 16 to the first sub-clutch 22 or the second sub-clutch 24, as well as an open setting. The 3/3 directional valve 46b enables a connection of the pump 14 to the first sub-clutch 22 or the second sub-clutch 24, as well as an open setting. The 3/3 directional valve 46c enables the connection of the pressure accumulator to the pump 14 or the reservoir 18, as well as an open setting. In FIG. 5, the 3/3 directional valves 46a, b, c are all shown in the open setting.

Figure 6:
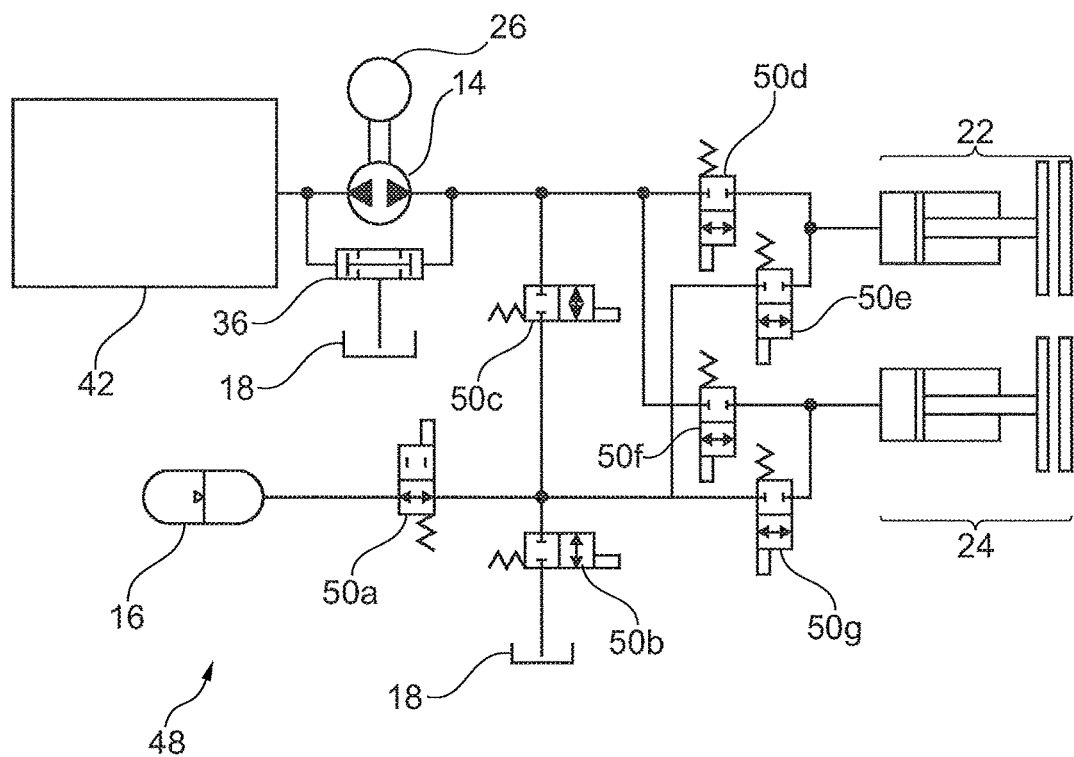
FIG. 6: shows a schematic illustration of a fluid assembly having seated valves.

Another embodiment of a fluid assembly 48 is depicted in FIG. 6. The same reference symbols are used for identical components in FIG. 6 as in FIG. 5. In FIG. 6, the valve system 20 comprises a total of seven seated valves 50a, b, c, d, e, f, g, which are designed as 2/2 directional valves, and each have a closed setting and an open setting. All of the seated valves 50a, b, c, d, e, f, g are depicted in an open setting. The pressure valve can be connected to the hydraulic line of the fluid assembly 48 by the seated valve 50a. A second reservoir 18 can be connected to the hydraulic line of the fluid assembly 48 by the seated valve 50b. The second reservoir 18 can be the reservoir 18 that is connected to the dual-pressure valve 36 thereby, or it can be another reservoir 18. The seated valve 50c enables a connection of the pump 14 to the pressure accumulator 16 and/or the reservoir 18. The pump 14 can be connected to the first sub-clutch 22 by the seated valve 50d. The pressure accumulator 16 and/or the reservoir 18 can be connected to the first sub-clutch 22 by the seated valve 50e. The seated valve 50f enables the pump 14 to actuate the second sub-clutch 24. The pressure accumulator 16 and/or the reservoir 18 can be connected to the second sub-clutch 24 by the seated valve 50g. It is possible thereby for the pump 14, together with the pressure accumulator 16 and/or the reservoir 18, to actuate the first sub-clutch 22 and/or the second sub-clutch 24. Furthermore, the pump 14 can actuate the second load 42 while at the same time, the pressure accumulator 16 and/or the reservoir 18 are connected to the first sub-clutch 22 and/or the second sub-clutch 24.

Figure 7:
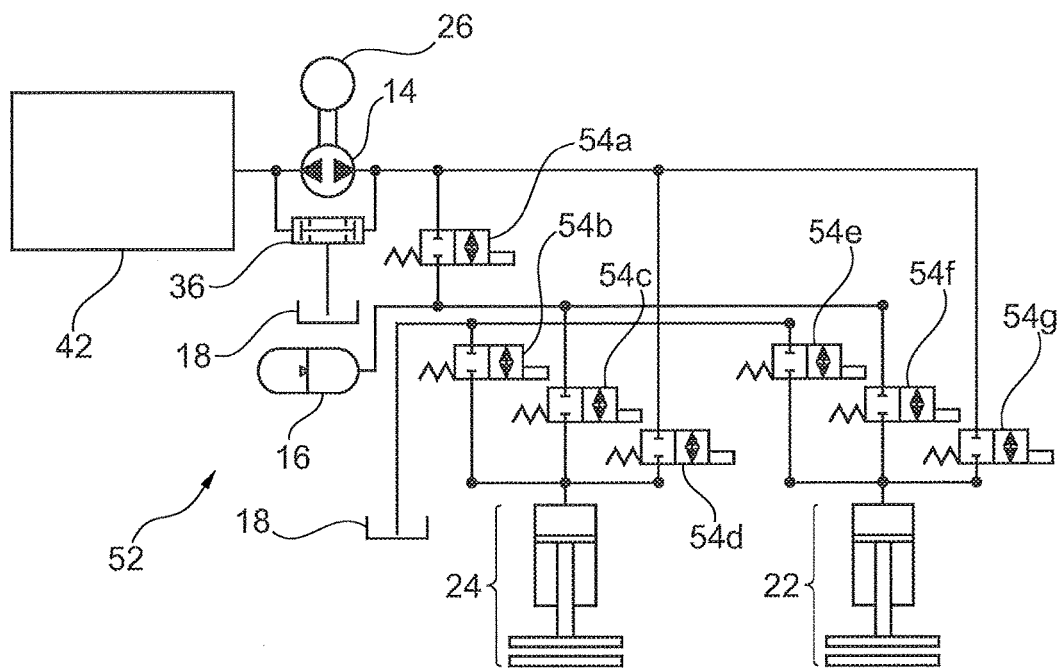
FIG. 7: shows a schematic illustration of a fluid assembly having an alternative valve system.

Another embodiment of a fluid assembly 52 is depicted in FIG. 7. The same reference symbols are used for identical components in FIG. 7 as in FIG. 6. In FIG. 7, the pressure accumulator 16 is connected to the pump 14 via its own hydraulic line. Furthermore, the second reservoir 18 is not connected to the pump 14 via a hydraulic line. The valve system 20 likewise comprises seven seated valves 54a, b, c, d, e, f, g in FIG. 7. The seated valves 54a, b, c, d, e, f, g are 2/2 directional valves, and have a closed setting and an open setting. All of the seated valves 54a, b, c, d, e, f, g are depicted in the open setting in FIG. 7. The pressure accumulator 16 is connected to the pump 14 by the seated valve 54a, such that the pump 14 can conduct fluid into the pressure accumulator 16, or the pump 14 can, together with the pressure accumulator, actuate the first sub-clutch 22 and/or the second sub-clutch 24. The reservoir 18 is connected to the second sub-clutch 24 using the seated valve 54b. The pressure accumulator 16 is connected to the second sub-clutch 24 by the seated valve 54c. The seated valve 54d enables a connection of the pump 14 with the second sub-clutch 24. The reservoir 18 is connected to the first sub-clutch 22 using the seated valve 54e. The pressure accumulator 16 is connected to the first sub-clutch 22 by the seated valve 54f. The seated valve 54g enables a connection of the pump 14 to the first sub-clutch 22. It is possible thereby for the pump 14 to actuate, together with the pressure accumulator 16, the first sub-clutch 22 and/or the second sub-clutch 24. Furthermore, the pump 14 can actuate the second load 42 while the pressure accumulator 16 and/or the reservoir 18 are connected at the same time to the first sub-clutch 22 and/or the second sub-clutch 24.

Figure 8:
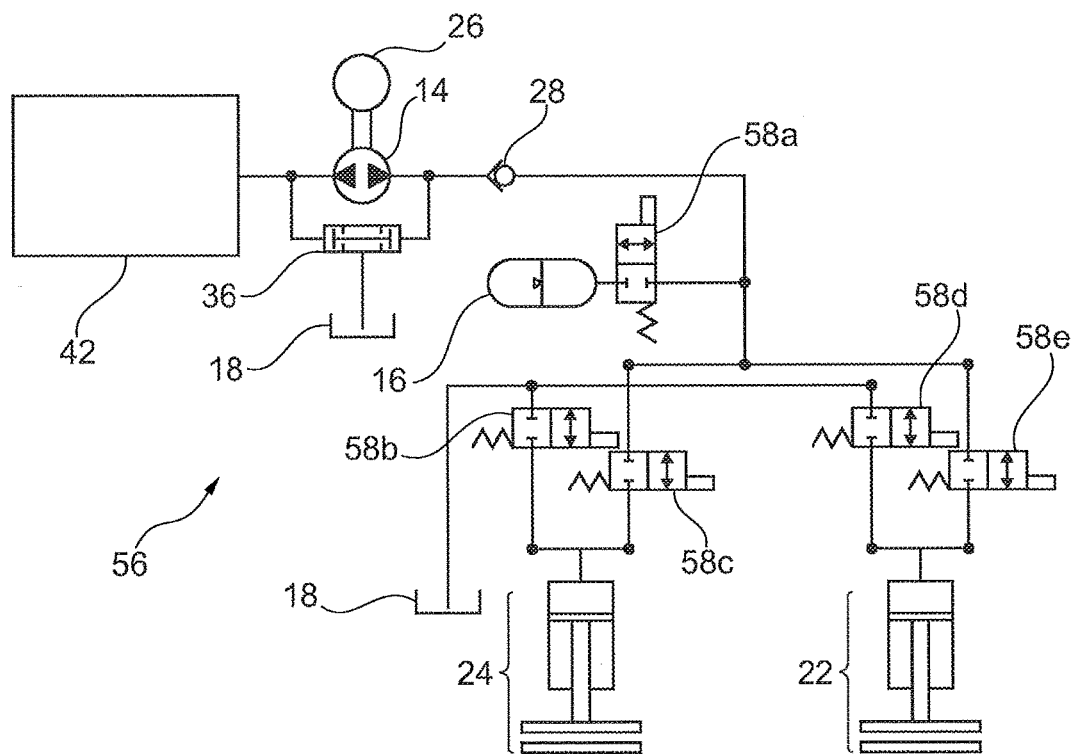
FIG. 8: shows a schematic illustration of a fluid assembly having another alternative valve system.

Another embodiment of a fluid assembly 56 is depicted in FIG. 8. The same reference symbols are used for identical components in FIG. 8 as in FIG. 7 and FIG. 2. In FIG. 8, the pressure accumulator 16 is only connected to the first sub-clutch 22 and the second sub-clutch 24 via a hydraulic line shared with the pump 14. Furthermore, the second reservoir 18 is not connected to the pump 14 via a hydraulic line. There is a non-return valve 28 in FIG. 8, so that only the pump 14 can transfer fluid to the pressure accumulator 16. The valve system 20 comprises five seated valves 58a, b, c, d, e in FIG. 8. The seated valves 58a, b, c, d, e are 2/2 directional valves, and have a closed setting and an open setting. All of the seated valves 58a, b, c, d, e are depicted in the open setting in FIG. 8. The pressure accumulator 16 is connected to the hydraulic line of the pump 14 by the seated valve 58a, such that the pump 14 can transfer fluid to the pressure accumulator 16, or the pump 14 can actuate, together with the pressure accumulator 16, the first sub-clutch 22 and/or the second sub-clutch. Moreover, the pressure accumulator 16 can be separated from the hydraulic line through an open setting of the seated valve 58a, such that the pump 14 can actuate the first sub-clutch 22 and/or the second sub-clutch 24 by itself. Furthermore, the pressure accumulator 16 can actuate the first sub-clutch 22 and/or the second sub-clutch 24, while the pump 14 actuates the second load 42. The reservoir 18 is connected to the second sub-clutch 24 using the seated valve 58b. The pressure accumulator 16 and/or the pump are connected to the second sub-clutch 24 by the seated valve 58c. The reservoir 18 is connected to the first sub-clutch 22 using the seated valve 58d. The pressure accumulator 16 and/or the pump 14 are connected to the first sub-clutch 22 by the seated valve 58e. It is possible thereby for the pump 14, together with the pressure accumulator 16, to actuate the first sub-clutch 22 and/or the second sub-clutch 24. Furthermore, the pump 14 can actuate the second load 42 while the pressure accumulator 16 and/or the reservoir 18 are connected at the same time to the first sub-clutch 22 and/or the second sub-clutch 24.

Figure 9:
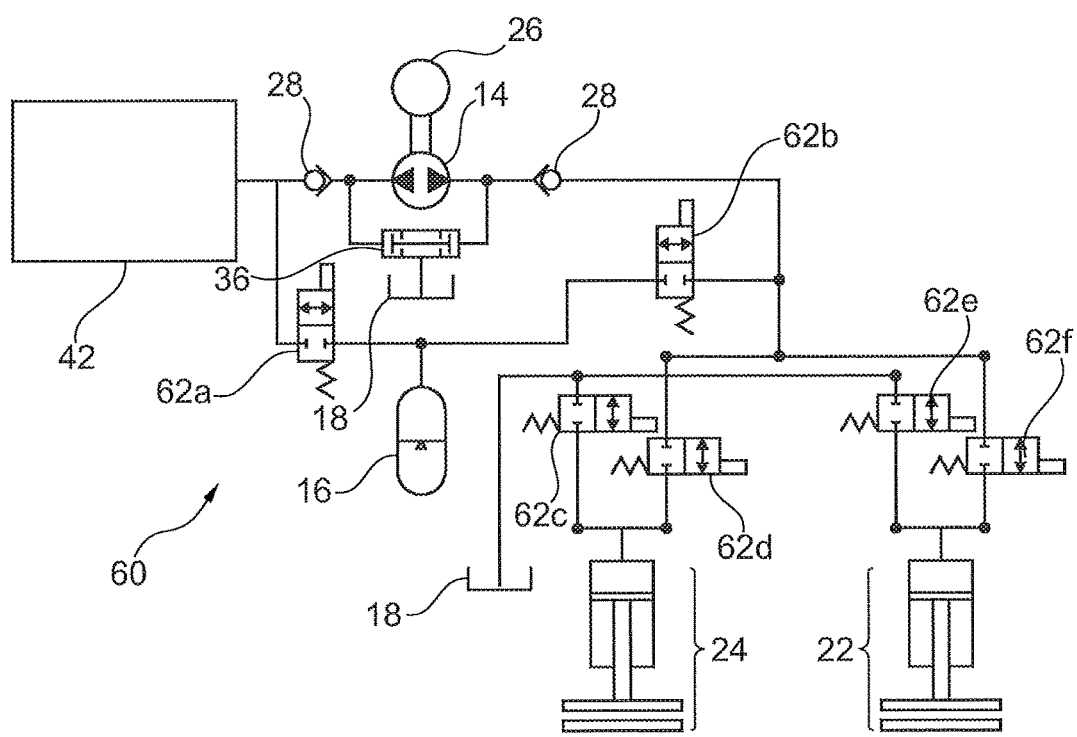
FIG. 9: shows a schematic illustration of a fluid assembly having another alternative valve system.

Another embodiment of a fluid assembly 60 is depicted in FIG. 9. The same reference symbols are used for identical components in FIG. 9 as in FIG. 8. In FIG. 9, the pressure accumulator 16 is connected to the second load 42 via its own hydraulic line. Furthermore, the second reservoir 18 is not connected to the pump 14 via a hydraulic line. There are two non-return valves 28 in FIG. 9, such that the pressure accumulator 16 cannot transfer any fluid to the pump 14. The valve system 20 comprises six seated valves 62a, b, c, d, e, f in FIG. 9. The seated valves 62a, b, c, d, e, f are 2/2 directional valves, and have a closed setting and an open setting. All of the seated valves 62a, b, c, d, e, f are depicted in the open setting in FIG. 9. The pressure accumulator 16 is connected to the second load 42 and the pump 14 by the seated valve 62a, such that the pump 14 can transfer fluid to the pressure accumulator 16, or the pressure accumulator 16 can actuate the second load 42, either together with the pump 14, or alone. The seated valve 62b enables the pressure accumulator to actuate the first sub-clutch 22 and/or the second sub-clutch 24, either together with the pump 14, or alone, e.g. when the pump 14 actuates the second load 42. The reservoir 18 is connected to the second sub-clutch 24 using the seated valve 62c. The pump 14 and/or the pressure accumulator 16 are connected to the second sub-clutch 24 by the seated valve 62d. The reservoir 18 is connected to the first sub-clutch 22 using the seated valve 62e. The pump 14 and/or the pressure accumulator 16 are connected to the first sub-clutch 22 by the seated valve 62f. The second load 42, the first sub-clutch 22 and/or the second sub-clutch 24 can be actuated by the pressure accumulator 16 or by the pump 14, or by both, by means of the fluid assembly depicted in FIG. 9.

LIST OF REFERENCE SYMBOLS 10 fluid assembly
12 load
14 pump
16 pressure accumulator
18 Reservoir
20 valve system
22 first sub-clutch
24 second sub-clutch
26 electrical motor
28 non-return valve
30 seated valve
32 fluid assembly
34 load
36 dual-pressure valve
38 fluid assembly
40 fluid assembly
42 second load
44 fluid assembly
46a, b, c 3/3 directional valve
50a, b, c, d, e, f, g seated valve
52 fluid assembly
54a, b, c, d, e, f, g seated valve
56 fluid assembly
58a, b, c, d, e, seated valve
60 fluid assembly
62a, b, c, d, e, f seated valve

The invention claimed is:

1. A fluid assembly for fluidic actuation of a first load and a second load of a motor vehicle in a hydraulic circuit, comprising:
    a pump configured to convey a fluid in the hydraulic circuit, and actuate the first or second load;
    a pressure accumulator configured to accumulate a pressure built up by the pump, and actuate the first or second load;
    one or more reservoirs configured to store the fluid; and
    a valve system for connecting the hydraulic circuit with the first load, the second load, the pump, the pressure accumulator, and the reservoir, wherein the reservoir is configured to store fluid when a dual-pressure valve is interconnected to the first load and the second load.

2. The fluid assembly of claim 1, wherein the first load is located in a clutch, and the second load is located in a transmission actuator, and the first and second load are connected to the pump.

3. The fluid assembly of claim 2, wherein the pump further includes a first discharge direction for actuating the first load and a second discharge direction, opposite the first discharge direction, for actuating the second load.

4. The fluid assembly of claim 1, wherein the pressure accumulator is connected to the first load and to the second load.

5. The fluid assembly of claim 1, wherein the valve system includes a setting in which the pressure accumulator and the pump are interconnected to actuate the first or second load.

6. The fluid assembly of claim 5, wherein the first load is a double clutch that includes a first sub-clutch and a second sub-clutch; and
the valve system further includes a sub-clutch setting in which the first sub-clutch or the second sub-clutch can be actuated by the pump.

7. The fluid assembly of claim 6, wherein the valve system includes a second sub-clutch setting in which the pump actuates the first sub-clutch or the second sub-clutch, and the pressure accumulator actuates the first sub-clutch or the second sub-clutch, wherein the sub-clutch actuated by the pump is not the sub-clutch actuated by the pressure accumulator.

8. The fluid assembly of claim 1, wherein the valve system includes a setting in which the pressure accumulator actuates the first load without the pump, and simultaneously, the pump actuates the second load without using the pressure accumulator.

9. A fluid assembly in a hydraulic circuit, comprising:
one or more reservoirs configured to store fluid;
a pump configured to transport the fluid in the hydraulic circuit and actuate a load from a transmission of a motor vehicle;
a pressure accumulator configured to collect pressure built up by the pump and actuate the load; and
a valve system configured to allow fluid communication of the load with the pump, wherein the valve system further includes a dual-pressure valve connected to the pump and reservoir.

10. The fluid assembly of claim 9, wherein the load is a clutch.

11. The fluid assembly of claim 10, wherein the clutch includes a first and second sub-clutch.

12. The fluid assembly of claim 11, wherein the valve system is configured to:
facilitate the pump to actuate the first sub-clutch; and
facilitate the pressure accumulator to actuate the second sub-clutch.

13. The fluid assembly of claim 9, wherein the hydraulic circuit further includes a motor configured to power the pump.

14. The fluid assembly of claim 9, wherein the valve system includes a non-return valve configured to prevent the pressure accumulator from transferring the fluid to the pump.

15. The fluid assembly of claim 9, wherein the valve system includes a seated valve that includes a closed setting configured to connect the pressure accumulator to the load, and an open setting configured to prevent a connection of the pressure accumulator with the load.

* * * * *